(12) United States Patent
Kitami

(10) Patent No.: US 8,212,769 B2
(45) Date of Patent: Jul. 3, 2012

(54) HIERARCHICAL STRUCTURE DISPLAY

(75) Inventor: Hirokazu Kitami, Tokyo (JP)

(73) Assignee: Oval Corporation, Tokyo (JP)

( * ) Notice: Subject to any disclaimer, the term of this patent is extended or adjusted under 35 U.S.C. 154(b) by 979 days.

(21) Appl. No.: 12/085,671

(22) PCT Filed: Feb. 26, 2007

(86) PCT No.: PCT/JP2007/054105
§ 371 (c)(1),
(2), (4) Date: May 29, 2008

(87) PCT Pub. No.: WO2007/100110
PCT Pub. Date: Sep. 7, 2007

(65) Prior Publication Data
US 2009/0167732 A1   Jul. 2, 2009

(30) Foreign Application Priority Data

Mar. 1, 2006   (JP) ................................. 2006-054354

(51) Int. Cl.
*G09G 5/00*   (2006.01)
(52) U.S. Cl. ........................................ 345/156; 345/204
(58) Field of Classification Search .................. 345/156, 345/204, 205, 184; 715/713, 853–856, 859–861
See application file for complete search history.

(56) References Cited

U.S. PATENT DOCUMENTS

| | | | |
|---|---|---|---|
| 6,539,243 B1 * | 3/2003 | Kimura et al. | 455/550.1 |
| 6,822,634 B1 * | 11/2004 | Kemp et al. | 345/156 |
| 2006/0097986 A1 * | 5/2006 | Mizuno | 345/156 |

FOREIGN PATENT DOCUMENTS

| | | |
|---|---|---|
| JP | 11-316635 | 11/1999 |
| JP | 2005-10451 | 1/2005 |

OTHER PUBLICATIONS

Machine English translation for Japanese patent document JP 11-316635; Sep. 11, 2011.*
Machine English translation for Japanese patent document JO 2005-010451; Sep. 11, 2011.*
International Search Report issued May 15, 2007 in the International (PCT) Application of which the present application is the U.S. National Stage.

* cited by examiner

*Primary Examiner* — Jimmy H Nguyen
(74) *Attorney, Agent, or Firm* — Wenderoth, Lind & Ponack, L.L.P.

(57) ABSTRACT

A hierarchical structure display device according to the present invention includes operation condition output means for outputting operation condition information for a switch operation condition of a first switch or a second switch to cause an operator to recognize the operation. condition information, and screen transition means for operating only when a detected switch operation of the first switch or the second switch satisfies the switch operation condition related to the operation condition information output from the operation condition output means to carry out a screen transition of a display screen. Further, the operation condition information is a display image which is displayed within the display screen and repeatedly inverted at predetermined timing during a switch operation, and a necessary number of times of inversion for the switch operation condition is displayed as the display image.

6 Claims, 5 Drawing Sheets

HIERARCHICAL STRUCTURE DISPLAY

TECHNICAL FIELD

The present invention relates to a display device including a display screen, and a first switch and a second switch provided outside the display screen, and more specifically, to a hierarchical structure display device which changes its display content on a display screen in a hierarchical fashion.

BACKGROUND ART

As a hierarchical structure display device which changes its display content on a display screen in a hierarchical fashion, hierarchical structure display devices disclosed in Japanese Patent Application Laid-open No. Hei 5-182090 and Japanese Patent Application Laid-open No. 2005-10451 are known. In the display device disclosed in Japanese Patent Application Laid-open No. Hei 5-182090, two vertical cursor keys (switches) and four selection function keys (switches) are provided outside a display screen to switch a screen display.

As is understood from the above description, the display device disclosed in Japanese Patent Application Laid-open No. Hei 5-182090 includes a large number of switches. Therefore, switching to a different mode can be easily selected in a cyclic manner within a basic mode. Moreover, even after the switching to the different mode, the switching selection can be cyclically made with ease in the different mode after the switching.

On the other hand, in contrast to the above-mentioned example, the display device disclosed in Japanese Patent Application Laid-open No. 2005-10451 is provided with only one switch. The display device disclosed in Japanese Patent Application Laid-open No. 2005-10451 uses a switch-ON duration time to select the switching to a different mode in a cyclical manner within the basic mode or to perform the switching selection in a cyclical manner within the different mode after the switching.

The use of the switch-ON duration time will be described briefly. For example, a control unit of the display device determines whether or not the switch-ON duration time is five seconds or longer. Then, when it is determined that the switch-ON duration time is five seconds or longer, the display is switched to be in the different mode. When it is determined that the switch-ON duration time is shorter than five seconds, the display is switched to that for the next switching selection in the same mode.

In the case of the display device disclosed in Japanese Patent Application Laid-open No. 2005-10451, if an operator is not informed of a precise processing status of a switch operation, the display is switched to be in the different mode against the will, for example. Therefore, the display device enables the operator to recognize the execution of the switch operation and a remaining time before the switching to the different mode (to recognize the processing status of the switch operation).

SUMMARY OF THE INVENTION

The display device having a large number of switches is effective in operability when the display device has a hierarchical structure with a large number of switching items. On the other hand, the display device disadvantageously affects a fabrication cost. This is because the switch is relatively expensive and the cost is increased as the number of switches increases one by one.

On the other hand, when only one switch is provided, the display device is good in terms of cost. However, the operability is adversely affected if the number of switching items becomes large. This is because the determination based on whether or not the switch-ON duration time is a predetermined time or longer has its limit. Moreover, in the case of the display device with only one switch, if the switch remains in the ON state for some reason (for example, the switch is in contact with an object to cause the switch to remain in the ON state), the switching selection or the switching to the different mode is repeated until the operator or the like is aware of the situation.

In view of the above-mentioned circumstances, the inventor of the present invention intends to solve the above-mentioned problems by a display device having a first switch and a second switch (two switches).

The present invention has an object of providing a hierarchical structure display device which is good in operability as well as in terms of cost.

In order to solve the above-mentioned problems, the present invention provides a hierarchical structure display device having a display screen, a first switch, and a second switch, the first switch and the second switch being provided outside the display screen, the display screen changing a display content in a hierarchical manner, the hierarchical structure display device including: operation condition output means for outputting operation condition information for a switch operation condition of the first switch or the second switch to cause an operator to recognize the operation condition information; and screen transition means for operating only when a detected switch operation of the first switch or the second switch satisfies the switch operation condition related to the operation condition information output from the operation condition output means to carry out a screen transition of the display screen.

According to the present invention having the characteristic as described above, it is only necessary for the operator to perform a switch operation of the first switch or the second switch according to the switch operation condition contained in the operation condition information. Only when the switch operation satisfies the switch operation condition, the screen transition of the display screen is carried out. Specifically, the display screen is switched. In the present invention, even if the switch operation continues for some reason, the screen transition of the display screen is not carried out unless the continuation of the switch operation satisfies the switch operation condition. In the present invention, the device is configured to cause the operator to recognize the switch operation condition for the first switch or the second switch to perform the switch operation necessary for the screen transition of the display screen.

According to the present invention, in the hierarchical structure display device described above, the operation condition information is any of visual information and acoustic information or a combination thereof, and is output to any of or both of the display screen and outside of the display screen.

According to the present invention having the characteristic as described above, as the case where the operation condition information is the visual information, a display on the display screen is given. In addition, an output by a light-emitting member such as a lamp or a combination of the light-emitting member and the screen display is also given. As the case where the operation condition is the acoustic information, a combination of a member emitting an electronic sound or the like and the screen display is given. The operation condition information may be any information as long as the operator can recognize the switch operation condition, and is output to the display screen, to the outside of the display screen or the like. The invention may further include "inversion" of a display image as a characteristic. The "inversion" of the display image may be replaced by the flash of the above-mentioned lamp or the presence/absence of the above-mentioned electronic sound. For example, the display of a necessary number of times of flashing and the flash of the lamp can also cause the operator to recognize the switch operation condition.

According to the present invention, in the hierarchical structure display device described above, the operation condition information is a display image which is displayed within the display screen and repeatedly inverted at predetermined timing during a switch operation, and a necessary number of times of inversion for the switch operation condition is displayed as the display image.

According to the present invention having the characteristic as described above, after the switch operation is started to invert the display image for the necessary number of times of inversion, the screen transition of the display screen is carried out to switch the display screen. If the switch operation inverts the display image for the number of times which exceeds or is less than the necessary number of times of inversion, the screen transition of the display screen is not carried out. As a result, the display screen is not switched. In the present invention, because the display image is repeatedly inverted at predetermined timing during the switch operation, the operator can easily count the necessary number of times of inversion by himself/herself. Because the inversion of the display image and the display of the necessary number of times of inversion are performed at the same position, the recognition of the switch operation condition by the operator is further ensured. At the same time, the operator can more easily get the right timing of the switch operation.

According to the present invention, in the hierarchical structure display device described above, the first switch and the second switch are enabled to perform the switch operation by a magnetic or optical function.

According to the present invention having the characteristic as described above, the present invention is also applicable to a display device which requires protection against explosion. The present invention does not exclude a switch having a mechanical contact such as a push button switch.

According to the present invention, a hierarchical structure display device which is good in operability as well as in terms of cost.

BRIEF DESCRIPTION OF THE DRAWINGS

FIG. 1(a) is a general view of the display device, FIG. 1 (b) is an explanatory view for inversion of operation condition information, FIG. 1(c) is an explanatory view illustrating a state where the operation condition information is displayed at different positions, FIG. 1(d) is a block diagram illustrating a main configuration, and FIG. 1(e) is a flowchart illustrating main processing.

DETAILED DESCRIPTION OF THE INVENTION

Figure 1:
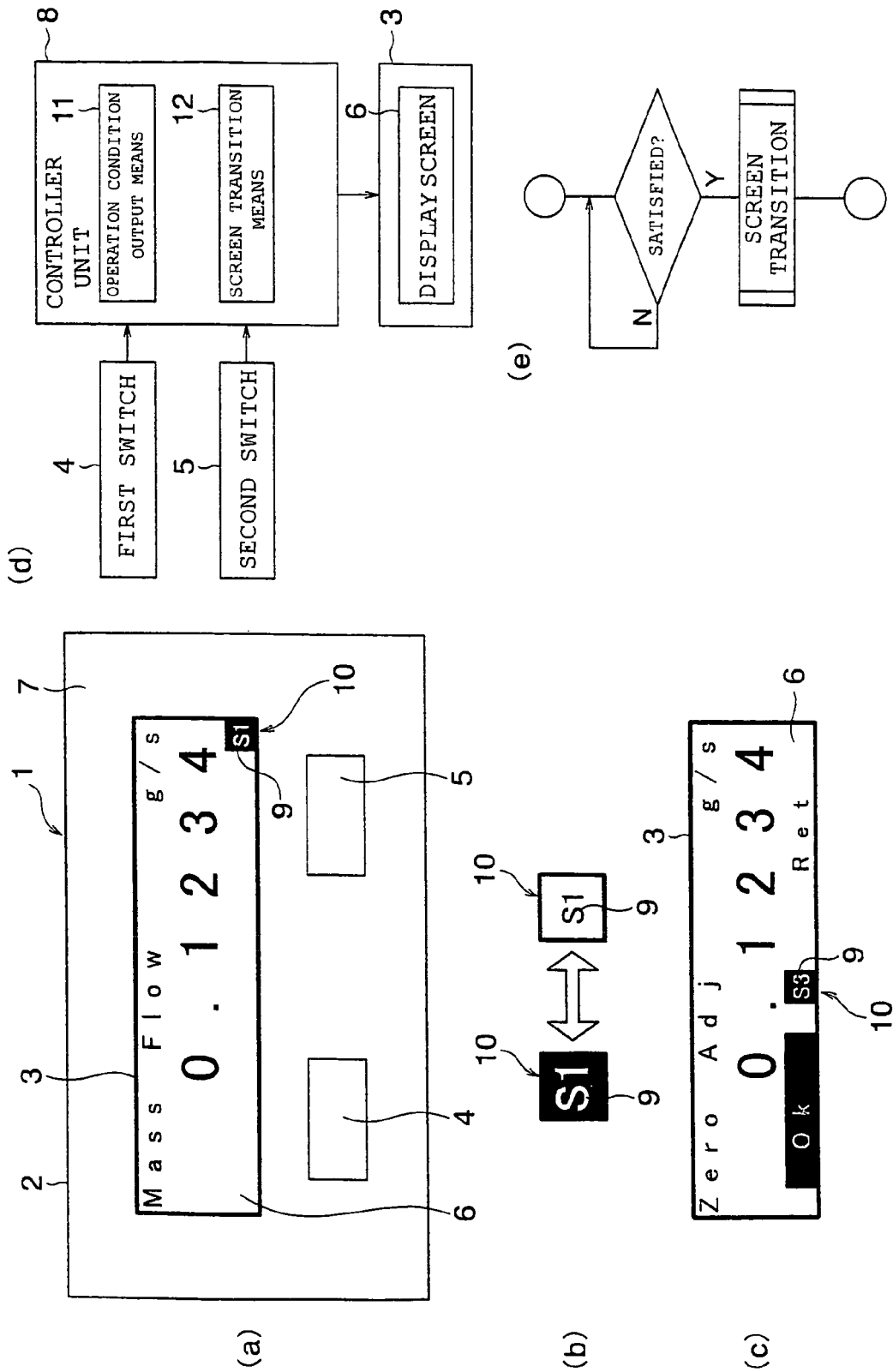
FIGS. 1(a)-1(e) are views illustrating an embodiment of a hierarchical structure display device according to the present invention, where

Hereinafter, a description will be given referring to the drawings. FIGS. 1(a)-1(e) are views illustrating an embodiment of a hierarchical structure display device according to the present invention, where FIG. 1 (a) is a general view of the display device, FIG. 1(b) is an explanatory view for inversion of operation condition information, FIG. 1 (c) is an explanatory view illustrating a state where the operation condition information is displayed at different positions, FIG. 1 (d) is a block diagram illustrating a main configuration, and FIG. 1 (e) is a flowchart illustrating main processing.

In FIG. 1(a), the reference numeral 1 denotes the display device according to the present invention. Although not particularly illustrated, the display device 1 is provided as a structure of a flow meter converter, specifically, and is provided to display a quantity of flow of a fluid. The display device 1 includes a main body 2, a liquid crystal display section 3 provided on a front face of the main body 2, and a first switch 4 and a second switch 5 similarly provided on the front face of the main body 2.

The display device 1 is configured as a hierarchical structure display device which changes its display content on a display screen 6 in the liquid crystal display section 3 in a hierarchical fashion. The display device 1 is configured to enable an operator (not illustrated) to recognize a switch operation condition (described below) for the first switch 4 or the second switch 5 to perform a switch operation required for a screen transition of the display screen 6.

In addition to the structure of the flow meter converter, the display device 1 is also applicable to a device having a man-machine interface (MMI) function used for a current meter or an industrial instrument. More specifically, the display device 1 is also applicable to devices other than the flow meter as long as the display device has a hierarchical structure and includes the liquid crystal display section 3, the first switch 4 and the second switch 5. First, each structure will be described below.

The main body 2 includes a box body 7, a circuit board (not illustrated) housed within the box body 7, and the like. The circuit board includes a controller unit 8 (see FIG. 1 (d)) including a known CPU or storage device. To the controller unit 8, the first switch 4 and the second switch 5 are electrically connected. The liquid crystal display section 3 is also electrically connected to the controller unit 8.

The controller unit 8 is configured and programmed to execute arithmetic processing required for displaying the quantity of flow of the fluid. The controller unit 8 is also configured and programmed to detect the switch operation of the first switch 4 or the second switch 5 to execute predetermined processing.

The controller unit 8 includes operation condition output means 11 which outputs operation condition information 10 for the switch operation condition 9 of the first switch 4 or the second switch 5 to cause the operator to recognize the operation condition information 10, and screen transition means 12 which operates only when the detected switch operation of the first switch 4 or the second switch 5 satisfies the switch operation condition 9 to carry out the screen transition of the display screen 6. In this embodiment, it is the CPU that has the functions of the operation condition output means 11 and the screen transition means 12. The operation condition output means 11 and the screen transition means 12 form a pair, and neither of them is omitted (the addition of another means is not prevented).

The operation condition information 10, which is output to the display screen 6 by the operation condition output means 11, is for the first switch 4 in this embodiment (this is only an example, and the operation condition information 10 may be for the second switch 5 although the specific description thereof is herein omitted; the operation condition information 10 may also be output to each of the switches 4 and 5). The operation condition information 10 is output as a display image which is repeatedly inverted at a predetermined timing (for example, every second) during the switch operation. In regard to the inversion, states as shown in FIG. 1 (b) are repeated during the switch operation.

The operation condition information 10 contains the switch operation condition 9. The switch operation condition 9 is displayed as "S1" in FIG. 1 (a) and as "S3" in FIG. 1 (c). The switch operation condition 9 "S1" or "S3" is only an example, and "S" means a select key (corresponding to the first switch 4). The numeral "1" or "3" indicates the number of times of inversion, which is required to satisfy the condition. The switch operation condition 9 may be any condition as long as the operator can recognize the condition at a glance. When the number of the switch operation conditions 9 is to be increased, "S2", "S4" or the like may be set (allowing the number of switching items to be increased) although not particularly illustrated.

The switch operation condition 9 "S1" indicates that the screen transition is carried out when the operation is stopped after the currently displayed operation condition information 10 is inverted once by the select key (corresponding to the first switch 4). The switch operation condition 9 "S3" indicates that the screen transition is carried out when the operation is stopped after the currently displayed operation condition information 10 is inverted three times by the select key (corresponding to the first switch 4). The controller unit 8 not only detects the switch operation but also determines whether or not the detected switch operation satisfies a necessary number of times of the inversion to carry out the screen transition processing only when the detected switch operation satisfies the necessary number (see FIG. 1 (e); Y indicates that the detected switch operation satisfies the necessary number of times of inversion; the screen transition processing is executed by the screen transition means 12). On the other hand, when the number of times of inversion caused by the detected switch operation exceeds or is below the necessary number of times of inversion, the screen transition is not carried out.

The operation condition information 10 is displayed at a different position depending on the different switch operation condition 9 ("S1" or "S3"). In this embodiment, in the case of "S1", the operation condition information 10 is output to a lower right position of the display screen 6. In the case of "S3", the operation condition information 10 is output to a lower center position of the display screen 6.

The operation condition information 10 is displayed at different positions because the display position allows the operator to inevitably recognize a condition to be operated. More specifically, if the operator keeps the switch operation condition in mind, the operator can immediately recognize the condition to be operated thinking, for example, "the number of inversion is one because the display is displayed at a lower right position of the display screen 6".

Besides, the operation condition information 10 is displayed at different positions to avoid the switch operation caused by the wrong assumption of the operator (to prevent an erroneous operation). Specifically, if the operation condition information 10 is always displayed at the same position, there is a possibility that the operator may believe "the next operation will be the same as the switch operation condition 9 just before" to induce the erroneous operation. When the display position differs depending on the different switch operation condition 9, the different display position can alert the operator to avoid the switch operation induced by the wrong assumption.

As each of the first switch 4 and the second switch 5, not only a switch having a mechanical contact such as a push button switch but also a non-contact switch based on magnetic or optical detection can be used. For example, the type of switch which detects a magnetic body or a magnet coming closer from the exterior or the type of switch externally emitting light, which operates by detecting a reflection of the light by an obstacle such as a hand, are available as options. In this embodiment, each of the first switch 4 and the second switch 5 performs the switch operation when the magnet is brought closer to the switch. The non-contact switch is particularly effective when explosion protection is needed.

Figure 2:
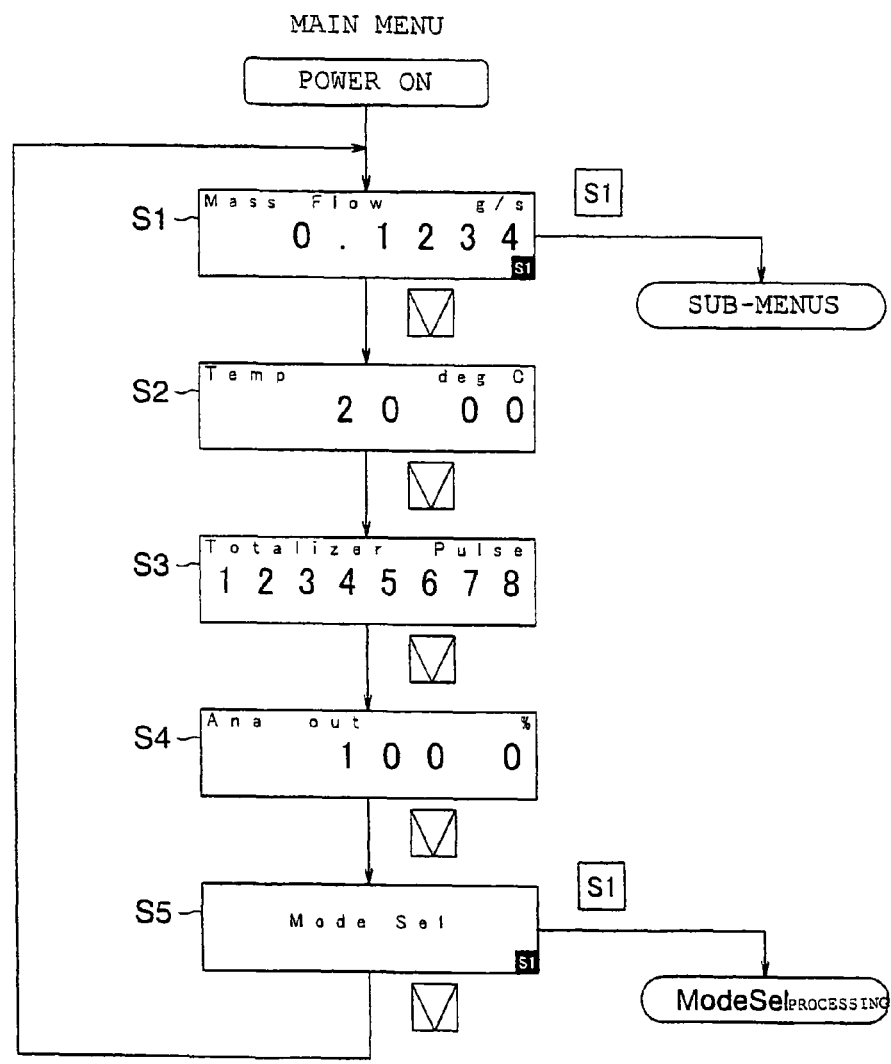
FIG. 2 is a flowchart for an operation of a main menu.
Figure 3:
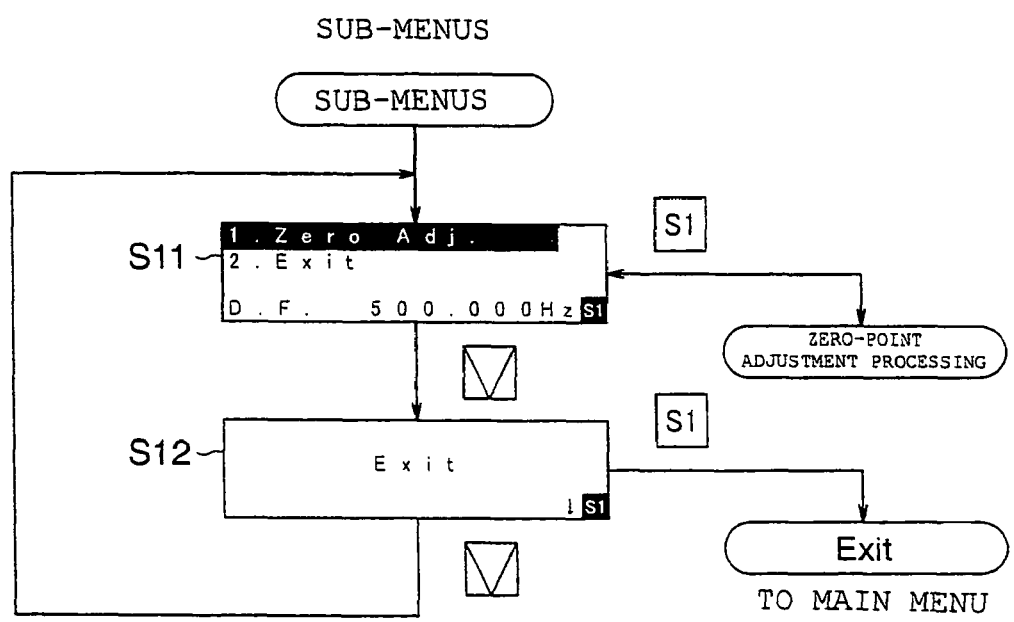
FIG. 3 is a flowchart for an operation of sub-menus.
Figure 4:
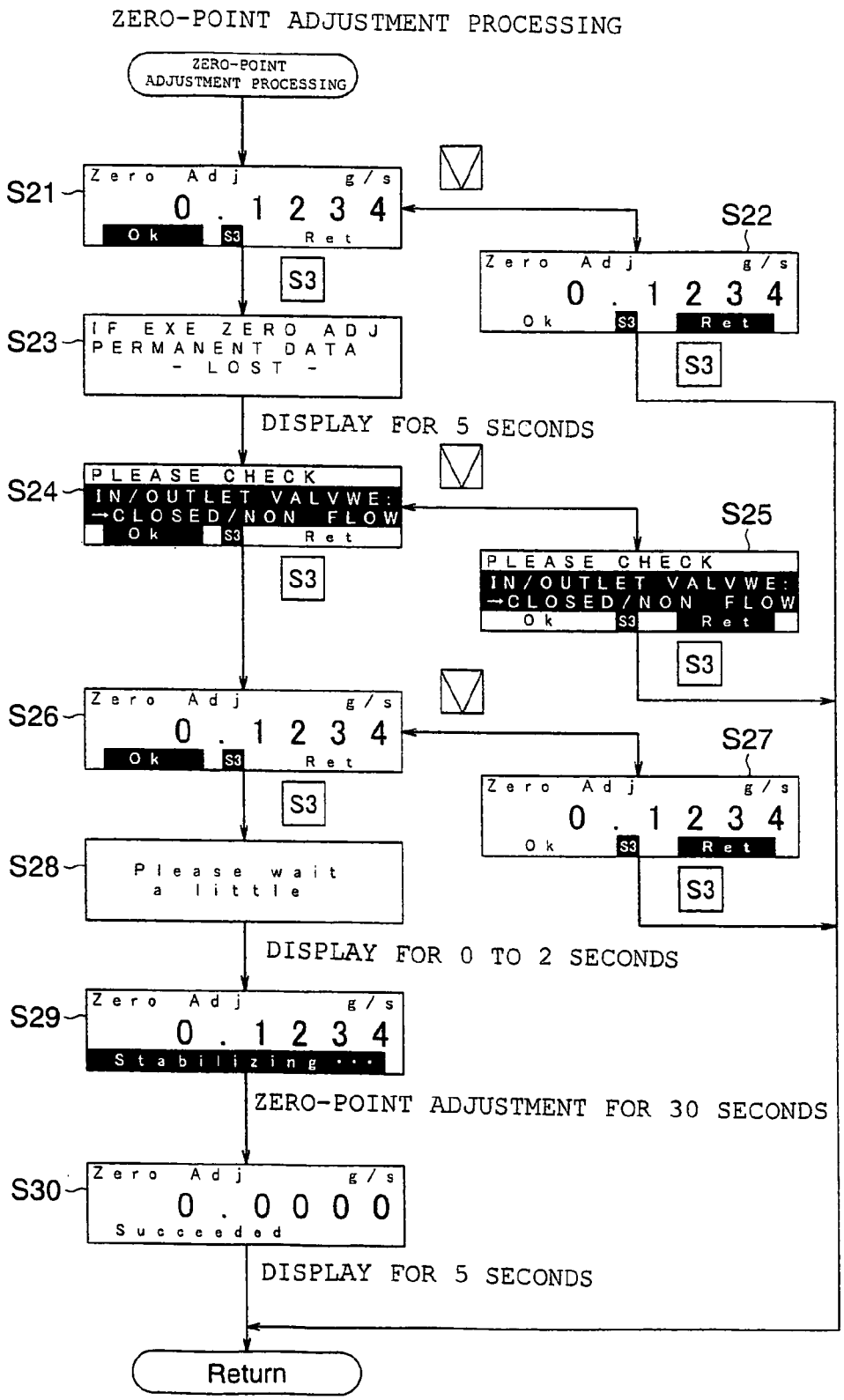
FIG. 4 is a flowchart for an operation of zero-point adjustment processing.
Figure 5:
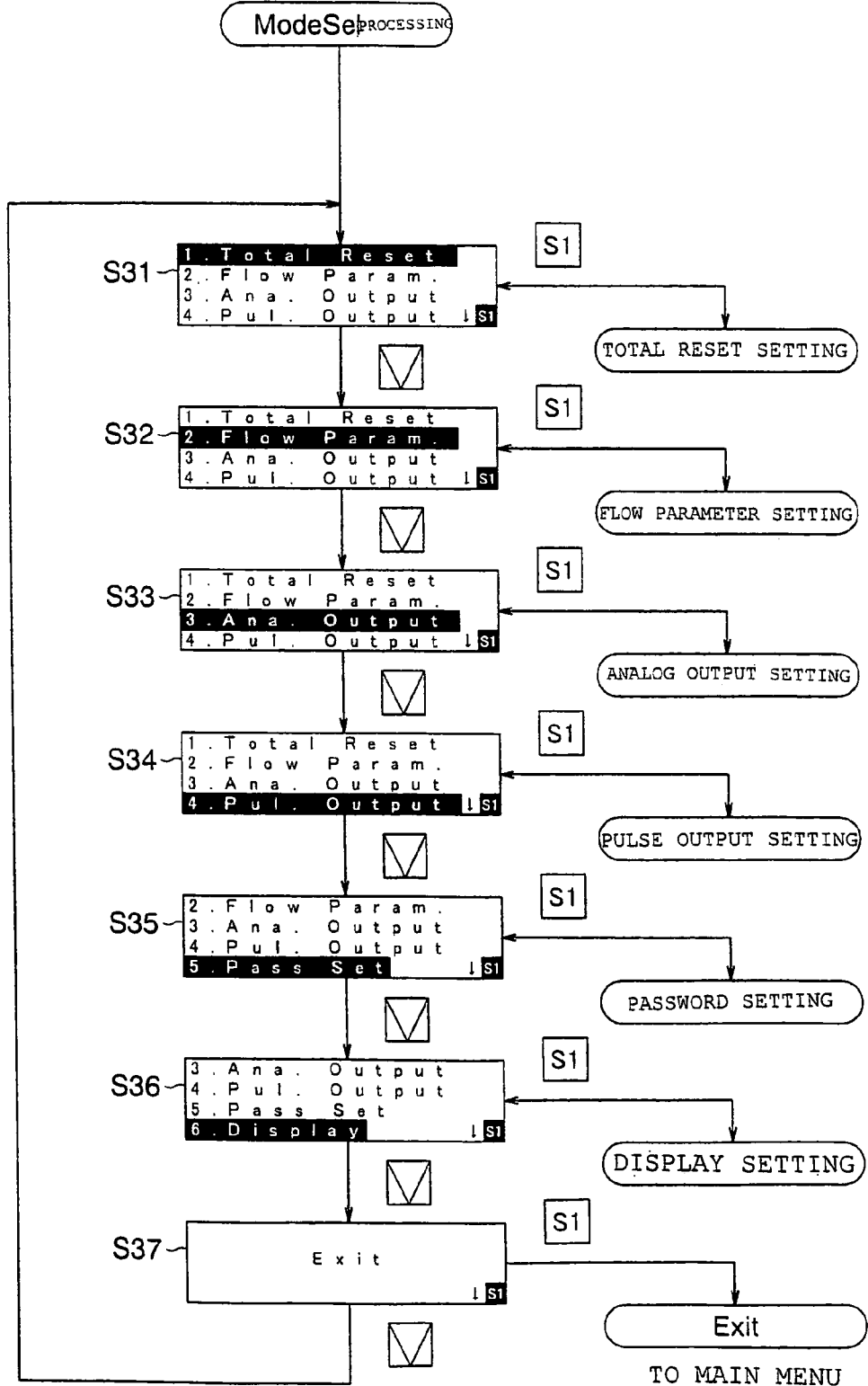
FIG. 5 is a flowchart for an operation of Mode Sel.

Next, an exemplary switch operation in the display device 1 will be described referring to FIGS. 2 to 5. FIG. 2 is a flowchart for an operation of a main menu, FIG. 3 is a flowchart for an operation of sub-menus, FIG. 4 is a flowchart for an operation of zero-point adjustment processing, and FIG. 5 is a flowchart for an operation of Mode Sel. FIGS. 1(a)-1(e) are also referred to as needed.

In the following description and the drawings, the first switch 4 is used as the select key, whereas the second switch 5 is used as a scroll key. The select key corresponds to "S1" or "S3" surrounded by a rectangle, whereas the scroll key corresponds to a downward-pointing triangle (▼) surrounded by a rectangle. An oblong box in the drawing corresponds to the display screen 6 (on the display screen 6, a corresponding screen is displayed).

In FIG. 2, after power is turned ON to operate the display device 1, an initial screen is displayed. Thereafter, a display as in Step S1 is performed, specifically, a mass flow is displayed. At a lower right position of the box (display screen 6) in Step S1, the operation condition information 10 is output to be displayed. The operation condition information 10 contains the switch operation condition 9 of "S1". Herein, the operation condition information 10 indicates that the screen transition is carried out when the operator stops the switch operation after the operator uses the select key (first switch 4) to invert the operation condition information once.

The switch operation of the select key (first switch 4) starts inverting the operation condition information 10. Then, when the switch operation is stopped just after the operation condition information 10 is inverted once, the screen display switches to a sub-menu screen display (described below). If the number of times of the inversion of the operation condition information 10 exceeds one, the screen transition is not carried out. Therefore, if the switching to the sub-menu screen display is desired, it is only necessary to perform the switch operation again. The operation condition information 10 does not repeat the inversion at the predetermined timing (for example, every second) other than during the switch operation.

When the switch operation (herein, the operation for one second) of the scroll key (second switch 5) is performed on the screen display in Step S1, processing of carrying out a cyclical screen transition in the main menu is executed to display a screen as in Step S2 (the operation condition information 10 is not present on the screen display in Step S2). Thereafter, when the switch operation of the scroll key (second switch 5) is performed again, a display as in Step S3 is performed on the screen (the operation condition information 10 is not present on the screen display in Step S3). When the switch operation of the scroll key (second switch 5) is performed again, a display as in Step S4 is performed on the screen (the operation condition information 10 is not present on the display screen in Step S4).

When the switch operation of the scroll key (second switch 5) is performed again, a display as in Step S5 is performed on the screen. Specifically, on the screen in Step S5, "Mode Sel" is displayed. At the lower right position of the screen in Step S5, the operation condition information 10 is output to be displayed. The operation condition information 10 contains the switch operation condition 9 of "S1".

The switch operation of the select key (first switch 4) on the screen display in Step S5 starts inverting the operation condition information 10. Then, when the switch operation is stopped just after the operation condition information 10 is inverted once, the screen display switches to that for Mode Sel processing (described below). On the other hand, the switch operation of the scroll key (second switch 5) causes the screen display to return to that in Step S1. On the screen in Step S1, the mass flow is displayed.

In FIG. 3, after the screen display is switched to that of the sub-menus, a display as in Step S11 is performed on the screen. Specifically, several sub-menus are displayed on the screen in Step S11. At the lower right position of the screen in Step S11, the operation condition information 10 is output to be displayed.

The operation condition information 10 contains the switch operation condition 9 of "S1".

The switch operation of the select key (first switch 4) on the screen display in Step S11 starts inverting the operation condition information 10. When the switch operation is stopped just after the operation condition information 10 is inverted once, the screen display switches to that of the zero-point adjustment processing (described below). On the other hand, when the switch operation of the scroll key (second switch 5) is performed, a display as in Step S12 is performed on the screen. Specifically, "Exit" is displayed. At the lower right position of the screen in Step S12, the operation condition information 10 is output to be displayed. The operation condition information 10 contains the switch operation condition 9 of "S1".

The switch operation of the select key (first switch 4) on the screen display in Step S12 starts inverting the operation condition information 10. Then, when the switch operation is stopped just after the operation condition information 10 is inverted once, the sub-menus are terminated to switch the display screen to that of the main menu in FIG. 2. On the other hand, the switch operation of the scroll key (second switch 5) causes the display screen to return to that in Step S11. On the screen of Step S11, several sub-menus are displayed.

In FIG. 4, after the screen display switches to that of the zero-point adjustment processing, a display as in Step S21 is performed on the screen. At a lower center position of the screen in Step S21, the operation condition information 10 is output to be displayed. The operation condition information 10 contains the switch operation condition 9 of "S3". The operation condition information 10 herein indicates that the screen transition is carried out when the operator stops the switch operation after the operation condition information 10 is inverted three times by using the select key (first switch 4).

On both sides of the operation condition information 10, "OK" and "Ret" indicating reset are displayed. Each of "OK" and "Ret" is selected by the scroll key (second switch 5) to be displayed in an inverted manner. The display of the operation condition information 10 at the lower center position of the screen allows the operator to recognize that the operation condition has changed.

When the switch operation of the scroll key (second switch 5) is performed on the screen display in Step S21, a display as in Step S22 is performed on the screen. Specifically, the selection display switches from "OK" to "Ret". When the switch operation of the scroll key (second switch 5) is performed again, the screen display switches to that in Step S21.

At the lower center position of the screen in Step S22, the operation condition information 10 is output to be displayed. The operation condition information 10 contains the switch operation condition 9 of "S3".

The switch operation of the select key (first switch 4) on the screen display in Step S22 starts inverting the operation condition information 10. Then, when the switch operation is stopped just after the operation condition information 10 is inverted three times, the zero-point adjustment processing is terminated to switch the screen display to that of the sub-menus in FIG. 3.

On the other hand, the switch operation of the select key (first switch 4) on the screen display in Step S21 starts inverting the operation condition information 10. When the switch operation is stopped just after the operation condition information 10 is inverted three times, a display as in Step S23 is performed on the screen. The screen display in Step S23 is switched after being displayed for, for example, five seconds. As a result, a display as in Step S24 is performed on the screen.

At the lower center position of the screen in Step S24, the operation condition information 10 is output to be displayed. The operation condition information 10 contains the switch operation condition 9 of "S3". On both sides of the operation condition information 10, "OK" and "Ret" are displayed. When the switch operation of the scroll key (second switch 5) is performed, a display as in Step S25 is performed on the screen. Specifically, the selection display switches from "OK" to "Ret". When the switch operation of the scroll key (second switch 5) is performed again, the screen display switches to that in Step S24. At the lower center position of the screen in Step S25, the operation condition information 10 is output to be displayed. The operation condition information 10 contains the switch operation condition 9 of "S3".

The switch operation of the select key (first switch 4) on the screen display in Step S25 starts inverting the operation condition information 10. Then, when the switch operation is stopped just after the operation condition information 10 is inverted three times, the zero-point adjustment processing is terminated. Then, the screen display switches to that of the sub-menus in FIG. 3.

On the other hand, the switch operation of the select key (first switch 4) on the screen display in Step S24 starts inverting the operation condition information 10. When the switch operation is stopped after the operation condition information 10 is inverted three times, a display as in Step S26 is performed on the screen.

At the lower center position of the screen in Step S26, the operation condition information 10 is output to be displayed. The operation condition information 10 contains the switch operation condition 9 of "S3". On both sides of the operation condition information 10, "OK" and "Ret" are displayed. When the switch operation of the scroll key (second switch 5) is performed, a display as in Step S27 is performed on the screen. Specifically, the selection display switches from "OK" to "Ret". When the switch operation of the scroll key (second switch 5) is performed again, the screen display switches to that in Step S26. At the lower center position of the screen in Step S27, the operation condition information 10 is output to be displayed. The operation condition information 10 contains the switch operation condition 9 of "S3".

The switch operation of the select key (first switch 4) on the screen display in Step S27 starts inverting the operation condition information 10. When the switch operation is stopped just after the operation condition information 10 is inverted three times, the zero-point adjustment processing is terminated. The screen display switches to that of the sub-menus in FIG. 3.

On the other hand, the switch operation of the select key (first switch 4) on the screen display in Step S26 starts inverting the operation condition information 10. When the switch operation is stopped just after the operation condition information 10 is inverted three times, a display as in Step S28 is performed on the screen. The screen display in Step S28 switches after being displayed, for example, for 0 to 2 seconds. As a result, a display as in Step S29 is performed on the screen.

The screen display in Step S29 indicates that the zero-point adjustment is currently being performed. The screen display switches after being displayed, for example, for 30 seconds to make a display as in Step S30 on the screen. The screen display in Step S30 lasts, for example, for 5 seconds. As a result, the zero-point adjustment processing is completed. The screen display switches to that of the sub-menus in FIG. 3.

In FIG. 5, after the screen display switches to that for the Mode Sel processing, a display as in Step S31 is performed on the screen. Specifically, several menus are displayed to make the first menu (total reset setting) selectable. At the lower right position on the screen in Step S31, the operation condition information 10 is output to be displayed. The operation condition information 10 contains the switch operation condition 9 of "S1".

The switch operation of the select key (first switch 4) on the screen display in Step S31 starts inverting the operation condition information 10. Then, when the switch operation is stopped just after the operation condition information 10 is inverted once, processing transits to total reset setting processing to switch the display screen (the description of the total reset setting processing is herein omitted).

On the other hand, when the switch operation of the scroll key (second switch 5) is performed, a display as in Step S32 is performed on the screen. Specifically, several menus are displayed to make the second menu (flow parameter setting) selectable. At the lower right position on the screen in Step S32, the operation condition information 10 is output to be displayed. The operation condition information 10 contains the switch operation condition 9 of "S1".

The switch operation of the select key (first switch 4) on the screen display in Step S32 starts inverting the operation condition information 10. Then, when the switch operation is stopped just after the operation condition information 10 is inverted once, the processing transits to the flow parameter setting processing to switch the display screen (the description of the flow parameter setting is herein omitted).

On the other hand, when the switch operation of the scroll key (second switch 5) is performed, a display as in Step S33 is performed on the screen. Specifically, several menus are displayed to make the third menu (analog output setting) selectable. At the lower right position on the screen in Step S33, the operation condition information 10 is output to be displayed. The operation condition information 10 contains the switch operation condition 9 of "S1". Steps S34 to S36 are processing of pulse output setting, password setting, and display setting, respectively. Since Steps S33 to S36 are the same as the processing described above, the description thereof is herein omitted.

The screen display in Step S37 is "Exit". At the lower right position of the screen, the operation condition information 10 is output to be displayed. The operation condition information 10 contains the switch operation condition 9 of "S1". The switch operation of the select key (first switch 4) on the screen display in Step S37 starts inverting the operation condition information 10. Then, when the switch operation is stopped just after the operation condition information 10 is inverted once, the Mode Sel processing is terminated to switch the screen display to that of the main menu in FIG. 2. On the other hand, the switch operation of the scroll key (second switch 5) causes the screen display to return to the screen display in Step S31.

As described above referring to FIGS. 1 to 5, it is only necessary for the operator to perform the switch operation according to the switch operation condition 9 contained in the operation condition information 10. In the display device 1, only when the switch operation satisfies the switch operation condition 9, the screen transition of the display screen 6 is carried out. Specifically, the display screen 6 is switched.

It is apparent that various other changes are possible for the present invention without departing from the scope of the present invention.

The invention claimed is:

1. A hierarchical structure display device including a display screen, a first switch, and a second switch, the first switch and the second switch being provided outside the display screen, the display screen changing a display content in a hierarchical manner, the hierarchical structure display device comprising:
    an operation condition output means for outputting operation condition information for a switch operation condition of the first switch or the second switch, the operation condition information being output to cause an operator to recognize the operation condition information and being output to display a necessary number of times visual information and/or acoustic information needs to be inverted during a switch operation; and
    a screen transition means for operating only when a detected switch operation of the first switch or the second switch satisfies the switch operation condition related to the operation condition information output from the operation condition output means to carry out a screen transition of the display screen, the screen transition of the display screen occurring after the detected switch operation of the first switch or the second switch inverts the visual information and/or acoustic information the necessary number of times so as to satisfy the operation condition information.

2. The hierarchical structure display device according to claim 1,
    wherein the operation condition information is a display image which is displayed within the display screen and repeatedly inverted at a predetermined timing during a switch operation, and
    wherein a number of times the first switch is required to be inverted for selecting a function necessary for satisfying the switch operation condition is displayed as a numeral in the display image.

3. The hierarchical structure display device according to claim 2, wherein the first switch and the second switch are a push switch, a magnetic switch, or an optical switch.

4. The hierarchical structure display device according to claim 2, wherein the display image is displayed at a display position which differs depending on different switch operation conditions.

5. The hierarchical structure display device according to claim 4, wherein the first switch and the second switch are a push switch, a magnetic switch, or an optical switch.

6. The hierarchical structure display device according to claim 1, wherein the first switch and the second switch are a push switch, a magnetic switch, or an optical switch.

* * * * *